(No Model.)
J. L. T. LINSON.
VEHICLE BRAKE.
No. 339,794. Patented Apr. 13, 1886.
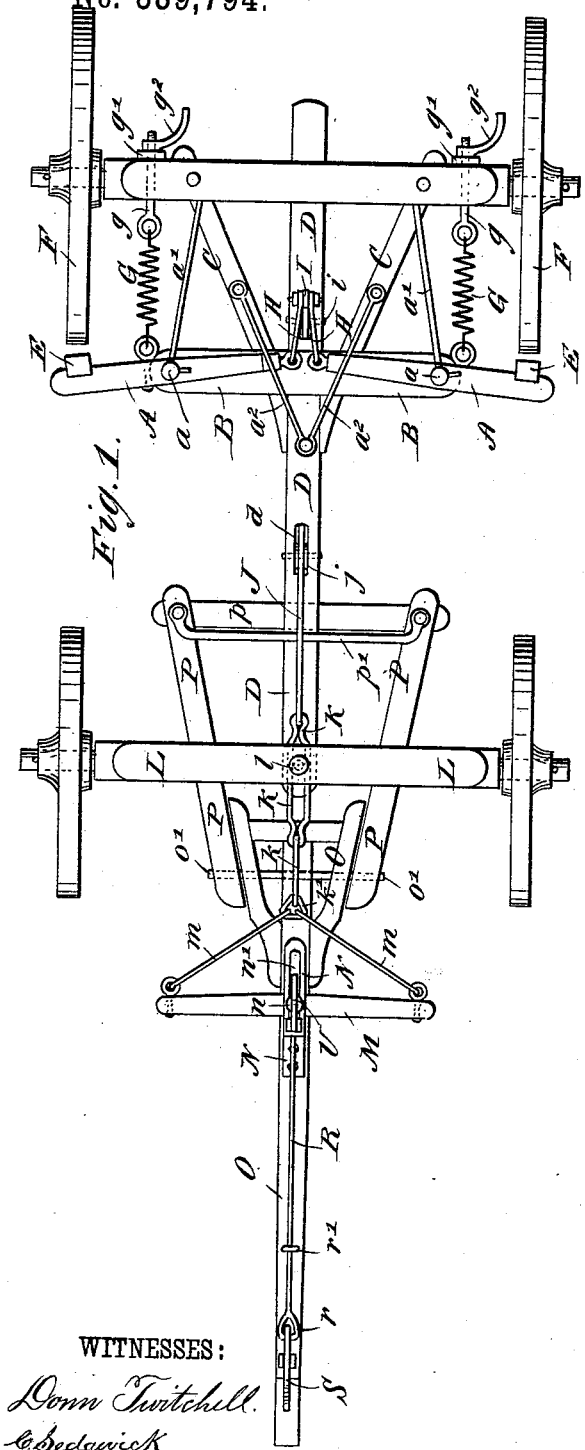
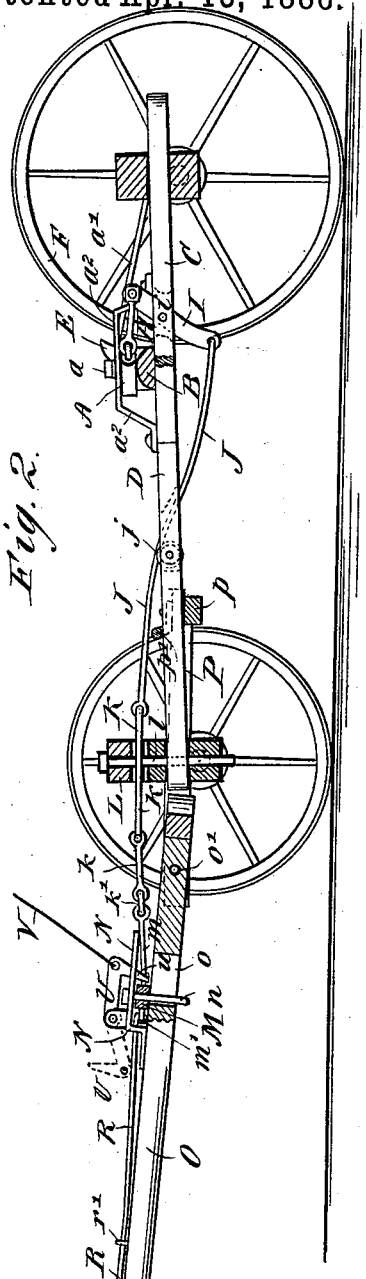
WITNESSES:
Donn Twitchell
C. Sedgwick
INVENTOR:
J. L. T. Linson
BY Munn & Co.
ATTORNEYS.
N. PETERS, Photo-Lithographer, Washington, D. C.

UNITED STATES PATENT OFFICE.

JAMES L. T. LINSON, OF JOHNSON COUNTY, MISSOURI.

VEHICLE-BRAKE.

SPECIFICATION forming part of Letters Patent No. 339,794, dated April 13, 1886.

Application filed December 14, 1885. Serial No. 185,611. (No model.)

*To all whom it may concern:*

Be it known that I, JAMES L. T. LINSON, residing in the county of Johnson and State of Missouri, have invented a new and Improved Vehicle-Brake, of which the following is a full, clear, and exact description.

My invention relates to brakes for vehicles, and has for its object to provide simple, efficient, and durable brake devices, operating so that when the draft is applied to the vehicle the brakes will be taken off the wheels and so held, and whereby, also, when the vehicle moves suddenly forward on a downgrade the brakes will be automatically applied to the wheels.

The invention consists in certain novel features of construction and combinations of parts of the vehicle-brake, all as hereinafter fully set forth.

Reference is to be had to the accompanying drawings, forming part of this specification, in which similar letters of reference indicate corresponding parts in both the figures.

Figure 1 is a plan view of the running-gear of a wagon with my approved brake applied, and Fig. 2 is a longtuidinal sectional side elevation of the same.

Two levers, A A, are pivoted at $a$ $a$ to the opposite ends of a cross-bar, B, which is fixed to the rear hounds, C, and to the reach D, and at the outer ends of the levers A A are fixed the brake-shoes E E, which are adapted to be forced or drawn into contact with the tires of the hind wheels, F F, by springs G G, the one ends of which are connected to the brake-levers A A, outside of their pivots $a$ $a$, and their other ends are connected to eyebolts $g$ $g$, which are passed loosely through plates $g'$ $g'$, fixed to the rear axle and bolster. Outside of or behind the plates $g'$ $g'$ the eyebolts receive the handle-nuts $g^2$ $g^2$, by adjusting which on the bolts the tension of the springs G may may be regulated to apply the brake to the wheels with more or less force, as desired. Rods $a'$ $a'$ have eyes which engage and support the upper ends of the brake-lever pivots $a$, and the back ends of these rods are fixed to the rear axle or hounds to brace the pivots, and rods $a^2$ $a^2$, bent downward at opposite ends, where they are fixed to the rear hounds, C, and reach D, respectively, pass over the inner ends of the brake-levers A A and prevent them from rising, and thereby also maintain the brake-shoes E in proper positions relatively to the wheels F. Links H H, connected at one end to the inner ends of the brake-levers A A, are connected at their other ends with the upper end of a lever, I, which is pivoted at $i$ to and in the reach D, and to the lower end of the lever I is connected a rod, J, which passes forward and upward through a slot, $d$, in the reach and over an anti-friction roller, $j$, journaled in the slot. The forward end of the rod J is connected to the back end of a link, K, which is guided on the king-bolt $l$ of the forward bolster, L, and is connected at its forward end by a link, $k$, a ring, $k'$, and rods $m$ $m$ with the opposite ends of the double-tree M, to which the single-trees (not shown) may be attached in any approved way. A pin, $n$, which passes through the double-tree and through a lengthwise slot, $o$, in the tongue O, and through a lengthwise slot, $n'$, in a bridge piece or strap, N, secured to the tongue, holds the double-tree between the strap N and the tongue, and prevents lateral bodily movement of the double-tree while allowing it free horizontal swing on its pivot $n$, and also allowing the double-tree to move bodily forward and backward along the tongue, which latter is pivoted at $o'$ to the forward hounds, P, which are shown with a rear cross-bar, $p$, beneath the reach D, and a rear cross-bar, $p'$, ranging above the reach. A rod, R, passes through the strap N, and has a hook at its forward end, which engages an eye or staple, $m'$, in the double-tree M, and the rod R extends forward through a guide-eye, $r'$, on the tongue, and has a loop, $r$, at its forward end, which loop is adapted to be engaged by the rear hook ends, $s$, of a catch-lever, S, which is pivoted to lugs on the tongue, and is normally pressed downward at its hook end by a spring, $s'$. (See Fig. 2.) The ring $t$ of the neck-yoke T is held to the end of the tongue O, and forward of the hold-back-lug $t'$ on the tongue, and so that as the wagon moves forward onto the horses, when moving downhill, the neck-yoke will fall onto the forward end of the catch-lever S and lift its hook end $s$, to release the rod R, for a purpose presently explained. A hook, U, pivoted to lugs on the bridge-strap N, may be swung by a cord or chain, V, connected to it and within reach of the driver in the wagon, so that the rear bent end, u, of the hook may be swung downward through the strap-slot n' behind the double-tree M when the brakes are to be held off of the wheels, and when the brakes are in use the hook U will be swung forward to allow the double-tree to move back freely when the draft is not applied to it.

The operation is as follows: When the hook U is thrown forward, as in dotted lines in Fig. 2, and the brake-shoes E are drawn to the wagon-wheels by the springs G, the double-tree M and rod R will also be drawn backward, and when the draft is applied to the double-tree the tree and rod R will be drawn forward as the inner ends of the brake-levers A A are drawn backward, and the brake-shoes E will thereby be carried away from the wheels and the catch-lever S will engage the loop r of rod R and hold the brake "off," as shown in the drawings. When the wagon travels downhill, its sudden forward movement will throw the neck-yoke T on the catch-lever S, and release the rod R, whereupon the springs G will act instantly to apply the brakes to the wheels as the double-tree M and rod R are drawn backward; hence the brakes are taken off and applied automatically as often as the draft is applied and relaxed.

The spiral springs G may be substituted by bar or leaf springs with like effect, and for buggies or other light vehicles the lower end of the lever I will be connected to the link K by two rods, one running at each side of the reach-bar, instead of by a single bar, as at J, passing through the reach.

Having thus described my invention, what I claim as new, and desire to secure by Letters Patent, is—

1. In a vehicle-brake, the combination, with the tongue O and the double-tree M, fitted to slide on the same, of the pivoted and spring-pressed brake-levers A, the pivoted lever I, the links H, connected to the inner ends of the brake-levers and to the lever I, the rod J, and the link K, to which the rod J is connected, the said link being connected to the double-tree, substantially as herein shown and described.

2. In a vehicle-brake, the combination, with the tongue O, the double-tree fitted to slide thereon, and the reach D, provided with the friction-wheel j, of the pivoted and spring-pressed brake-levers A, the lever I, the links H, the rod J, the links K k, the ring k', and the rods m, substantially as herein shown and described.

3. In a vehicle-brake, the combination, with the tongue, a double-tree fitted to slide thereon, pivoted brake-levers, and connections between the double-tree and brake-levers, of the pivoted hook U and the cord V, substantially as herein shown and described.

4. In a vehicle-brake, the combination, with the tongue, a double-tree fitted to slide thereon, pivoted brake-levers, and connections between the double-tree and brake-levers, of a pivoted catch on the end of the tongue, and a rod connected to the double-tree and adapted to be engaged by the said catch, substantially as and for the purpose set forth.

5. In a vehicle-brake, the combination, with the tongue, brake-levers, and double-tree fitted to slide on the tongue and connected to the brake-levers, of the rod R, having its inner end connected to the double-tree and provided with a loop on its outer end, and the lever S, pivoted on the outer end of the tongue and provided with the hook s for engaging the loop of the said rod, substantially as herein shown and described.

JAMES L. T. LINSON.

Witnesses:
CHARLES B. WILSON,
JAS. R. CRABTREE.